US009436623B2

(12) United States Patent
Wertheimer et al.

(10) Patent No.: US 9,436,623 B2
(45) Date of Patent: Sep. 6, 2016

(54) RUN-TIME FABRIC RECONFIGURATION (71) Applicant: Intel Corporation, Santa Clara, CA (US)

(72) Inventors: Aviad Wertheimer, Tsur Hadassah (IL); Daniel Greenspan, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 13/623,501

(22) Filed: Sep. 20, 2012

(65) Prior Publication Data

US 2014/0082237 A1 Mar. 20, 2014

(51) Int. Cl.
*G06F 13/00* (2006.01)
*G06F 13/14* (2006.01)

(52) U.S. Cl.
CPC .................... *G06F 13/14* (2013.01)

(58) Field of Classification Search
CPC .... G06F 13/14; G06F 9/4411; G06F 13/385; G06F 13/4072; G06F 12/0661; G06F 13/409; G06F 13/4022; G06F 3/0601; G06F 3/0635; G06F 3/0689; G06F 15/17375; G06F 13/1657; G06F 15/7867; H04L 49/101
USPC ................ 710/104, 316, 317; 713/300–340
See application file for complete search history.

(56) References Cited

U.S. PATENT DOCUMENTS

| | | | | |
|---|---|---|---|---|
| 6,493,824 B1 * | 12/2002 | Novoa et al. | ................. | 713/162 |
| 7,058,009 B1 * | 6/2006 | Skirmont et al. | ............. | 370/217 |
| 7,058,918 B2 * | 6/2006 | Abramovici | ... | G01R 31/318555 716/126 |
| 7,310,594 B1 * | 12/2007 | Ganesan et al. | ................. | 703/13 |
| 7,774,590 B2 * | 8/2010 | Borkar et al. | ................. | 713/100 |
| 8,220,060 B1 * | 7/2012 | Simkins | .......................... | 726/26 |
| 2002/0138678 A1 * | 9/2002 | Kim | ...................... | G06F 13/364 710/240 |
| 2002/0194407 A1 * | 12/2002 | Kim | ............................ | 710/104 |
| 2003/0043815 A1 | 3/2003 | Tinsley et al. | | |
| 2004/0015638 A1 * | 1/2004 | Forbes | .......................... | 710/316 |
| 2006/0148447 A1 * | 7/2006 | Boesjes | ........................ | 455/406 |
| 2006/0218424 A1 * | 9/2006 | Abramovici et al. | ........ | 713/323 |

(Continued)

FOREIGN PATENT DOCUMENTS

WO 2014/046754 A1 3/2014

OTHER PUBLICATIONS

International Search Report and Written Opinion received for PCT Patent Application No. PCT/US2013/046221, mailed on Dec. 30, 2013, 11 pages.

(Continued)

*Primary Examiner* — Faisal M Zaman
(74) *Attorney, Agent, or Firm* — Law Office of R. Alan Burnett, PS (57) ABSTRACT

Methods, apparatus and systems for implementing run-time fabric reconfiguration are described herein. In accordance with one aspect, techniques are disclosed for implementing run-time fabric reconfiguration on a System on a Chip (SoC) via use of multiple endpoint fabric interfaces having routing logic that is dynamically reconfigured at run-time by a fabric control unit in response to system-state changes. The endpoint fabric interfaces may be coupled to or integrated in IP blocks that are coupled to a switch fabric, or may be implemented in the switch fabric itself. The run-time fabric reconfiguration techniques may be implemented to for various purposes and/or to address various events, such as node failures, security events, IP or design bugs, feature prototyping, and virtualization.

16 Claims, 7 Drawing Sheets

(56) References Cited

U.S. PATENT DOCUMENTS

| | | | |
|---|---|---|---|
| 2007/0124607 A1* | 5/2007 | Fuchs | 713/300 |
| 2008/0117909 A1* | 5/2008 | Johnson | 370/392 |
| 2009/0083460 A1* | 3/2009 | Mitra | G06F 15/7867 710/104 |
| 2009/0323571 A1* | 12/2009 | Arvind et al. | 370/311 |
| 2010/0250889 A1 | 9/2010 | Fang et al. | |
| 2011/0080920 A1 | 4/2011 | Klinglesmith et al. | |
| 2011/0321049 A1 | 12/2011 | Hickey et al. | |
| 2012/0089758 A1* | 4/2012 | Yun | G06F 13/4022 710/110 |
| 2012/0185674 A1* | 7/2012 | Taylor et al. | 712/37 |
| 2012/0232825 A1* | 9/2012 | Patil | G01R 31/318508 702/117 |
| 2012/0233514 A1 | 9/2012 | Patil et al. | |
| 2013/0054845 A1* | 2/2013 | Nimmala | G06F 13/4022 710/36 |
| 2013/0093462 A1* | 4/2013 | Teig | H03K 19/17744 326/38 |
| 2013/0268710 A1* | 10/2013 | Lowe | G06F 13/4027 710/306 |

OTHER PUBLICATIONS

International Preliminary Report on Patentability and Written Opinion Received for PCT Patent Application No. PCT/US2013/046221, mailed on Apr. 2, 2015, 8 pages.

\* cited by examiner

RUN-TIME FABRIC RECONFIGURATION

FIELD OF THE INVENTION

The field of invention relates generally to System on a Chip (SoC) and Network on a Chip (NoC) architecture, and, more specifically but not exclusively relates to techniques for facilitating run-time reconfiguration of fabrics employed by Systems, SoCs and NoCs.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago.

Historically, computer architectures employed discrete components, such as Central Processing Units (CPU, aka processors), memory controllers or hubs, IO (Input-Output) controllers or hubs, etc., that were interconnects via bus and/or interconnect wiring embedded on a board one which the discrete components were installed. In recent years, these conventional architectures have been superseded by System on a Chip (SoC) architectures, where various Intellectual Property (IP) blocks are interconnected via one or interconnect fabrics. As used herein, an IP block is representative of a block or logical group of circuitry that typically serves one or more targeted functions and may comprise logic that is either developed in-house or licensed from a third-party. IP blocks are also commonly referred to as functional blocks or "IP." The interconnect fabrics may typically comprise multiple point-to-point interconnects between various IP block endpoints, a cross-bar type interconnect (both commonly referred to as mesh-based fabrics), or a ring-type interconnect that includes multiple interconnect segments coupled between nodes on the ring that are coupled to the various IP blocks.

On one level, fabric interconnects operate similar to a computer network, wherein a multiple layer protocol is employed to transfer data between end points. For example, multiple IP blocks may be connected to a fabric, either directly or indirectly (e.g., via a bridge or other intermediary component) in a manner roughly analogous with multiple computers connected to a Local Area Network (LAN). To transfer data between a pair of IP blocks, a multilayer protocol is employed including address information such as source and destination addresses in a manner analogous to an IP network (noting the address format is different, among other differences). Like a LAN, the fabric includes interface (i.e., fabric ports) to which the IP blocks are connected, and facilitates switching/routing/forwarding of data between sending and receiving IP blocks, which may also be referred to as (network) nodes. In view of these similarities, integrated circuits employing these architectures are sometimes referred to as Network on a Chip (NoC) architectures, and the fabric interconnects may be referred to as fabric switches that facilitate data transfers between IP blocks comprising nodes coupled to the fabric.

Under a standard implementation of an on-chip fabric, the fabric routing tables or routing logic is configured in a static manner, where based on a certain field or fields of the packet entering the fabric (e.g., destination address) the packet destination will be a certain node or nodes. In cases where the destination node is powered down, should not receive the data due to security considerations or does not support the type of traffic forwarded to it the packet is either discarded or a notification is sent to the originator that the transaction failed, requiring software intervention. Such occurrences frequently lead to system crashes and/or "Blue Screen of Death" (BSoD) events.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods, apparatus and systems for implementing run-time fabric reconfiguration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, techniques are disclosed for implementing SoC architectures supporting run-time fabric reconfiguration. This enables the SoC to respond to various types of events, such as system-state changes, security events, design bugs, node failures, etc., in a robust and secure manner. For example, in accordance with one aspects, a Fabric controller unit that has knowledge of system states such as which nodes are powered down, what type of traffic is supported on certain nodes, what potential security threats exist on the Fabric and what bugs exist on IPs connected to the Fabric is configured to dynamically re-route the traffic to elements on the Fabric such as security engines and microcontrollers that can process the traffic correctly, rather than have the packets dropped or lead to system crashes or BSoD events.

Figure 1:
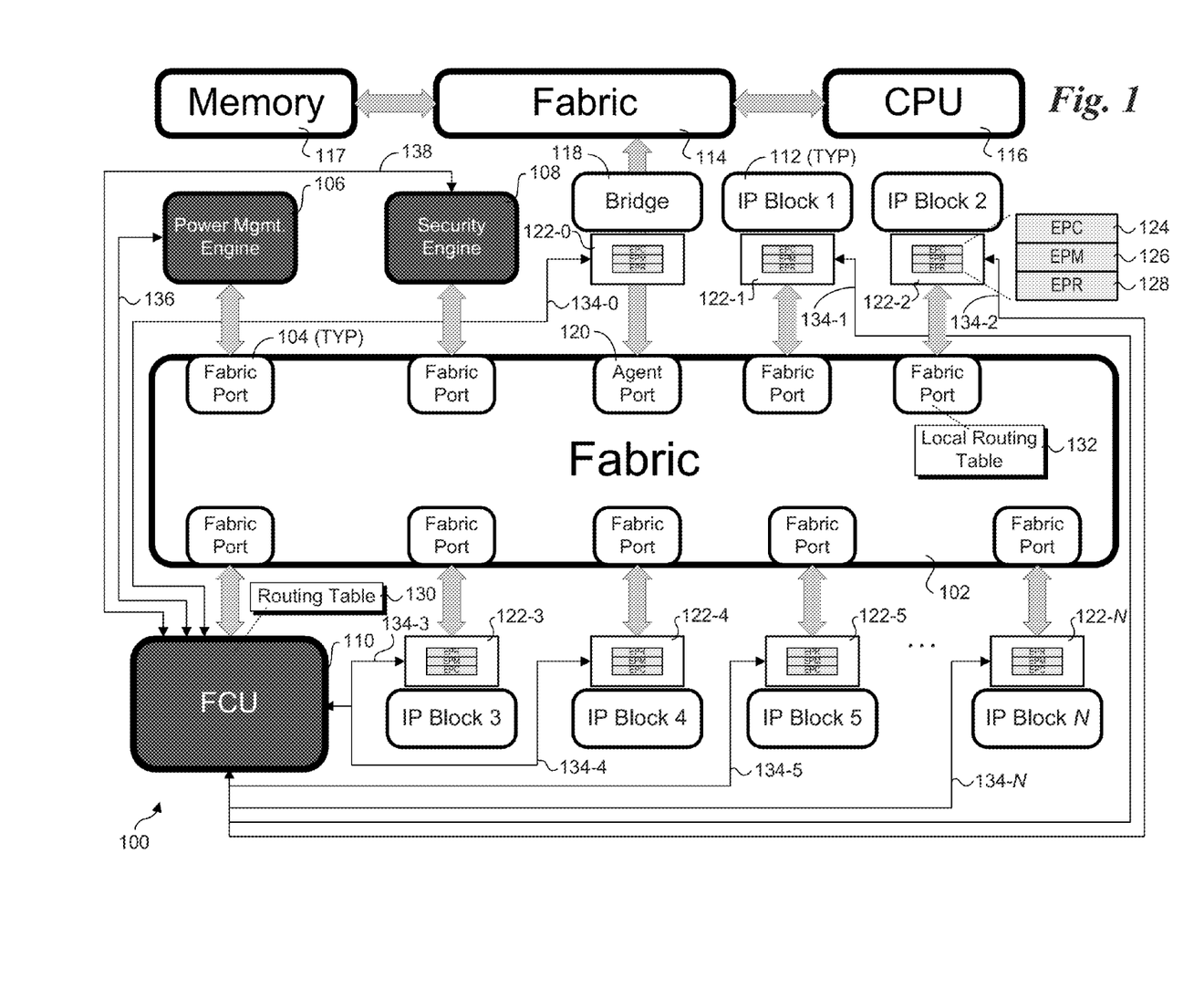
FIG. 1 is a schematic diagram illustrating an architecture of an exemplary SoC employing a fabric that supports run-time reconfiguration, according to one embodiment.

By way of example and not limitation, FIG. 1 shows an architecture 100 including a fabric 102 to which multiple components are coupled at respective fabric ports 104. The components include a power management engine 106, a security engine 108, a Fabric Control Unit (FCU) 110, and a plurality of IP blocks 112. For convenience and simplicity, an IP block may also be referred to by its IP block number in the drawing figures herein, e.g., IP block 1, IP block 2, etc. Architecture 100 also includes a second fabric 114 to which a CPU 116 and memory 117 are coupled and which is also communicatively coupled to fabric 102 via a fabric-to-fabric bridge 118 and an agent port 120.

As further detailed towards the upper right corner of FIG. 1, each of fabric-to-fabric bridge 118 and IP blocks 112 includes an endpoint fabric interface 122 (labeled 122-0, 122-1, 122-2 . . . 122-N for bridge 118 and IP blocks 1, 2, . . . N, respectively) that is configured to function as an interface to fabric 102 via a corresponding fabric port 104. For example, an endpoint fabric interface includes input and output queues for buffering output and inbound packet data, as well as associated logic for facilitating fabric interface operations. These conventional aspects of fabric interfaces are known to those having skill in the art, and accordingly, further details of these aspects are not discussed herein.

In addition to the conventional aspects, each endpoint fabric interface 122 further includes an Endpoint Classifier (EPC) unit 124, an Endpoint Measurement (EPM) unit 126 and an Endpoint Routing (EPR) unit 128. These components extend the conventional fabric interface functionality to support run-time fabric reconfiguration and handling of packets in consideration of various criteria, as described in detail below.

As further shown in FIG. 1, FCU 110 is communicatively coupled to each of endpoint fabric interfaces 122-0 . . . 122-N via a sideband channel connection 134-0 . . . 134-N. FCU 110 is also communicatively coupled to each of power management engine 106 and security engine 108 via respective connections 136 and 138. Optionally, communication between FCU 110 and one or more of the endpoint fabric interfaces, security engine or power management engine is implemented via messages sent via fabric 102.

Figure 1A:
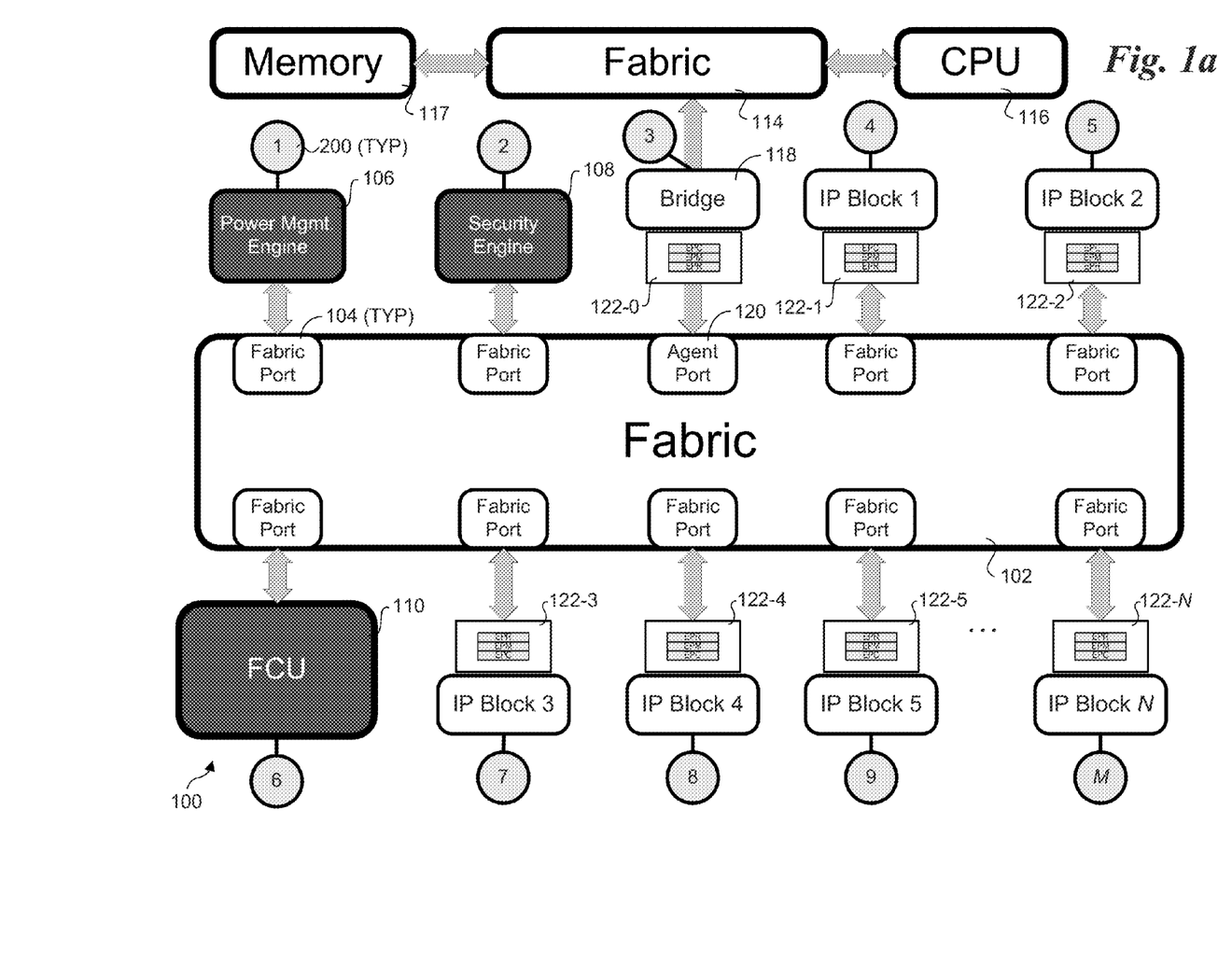
FIG. 1a is a schematic diagram showing an abstracted view of the SoC architecture of FIG. 1 illustrating the Network on a Chip aspect of the architecture.
Figure 2:
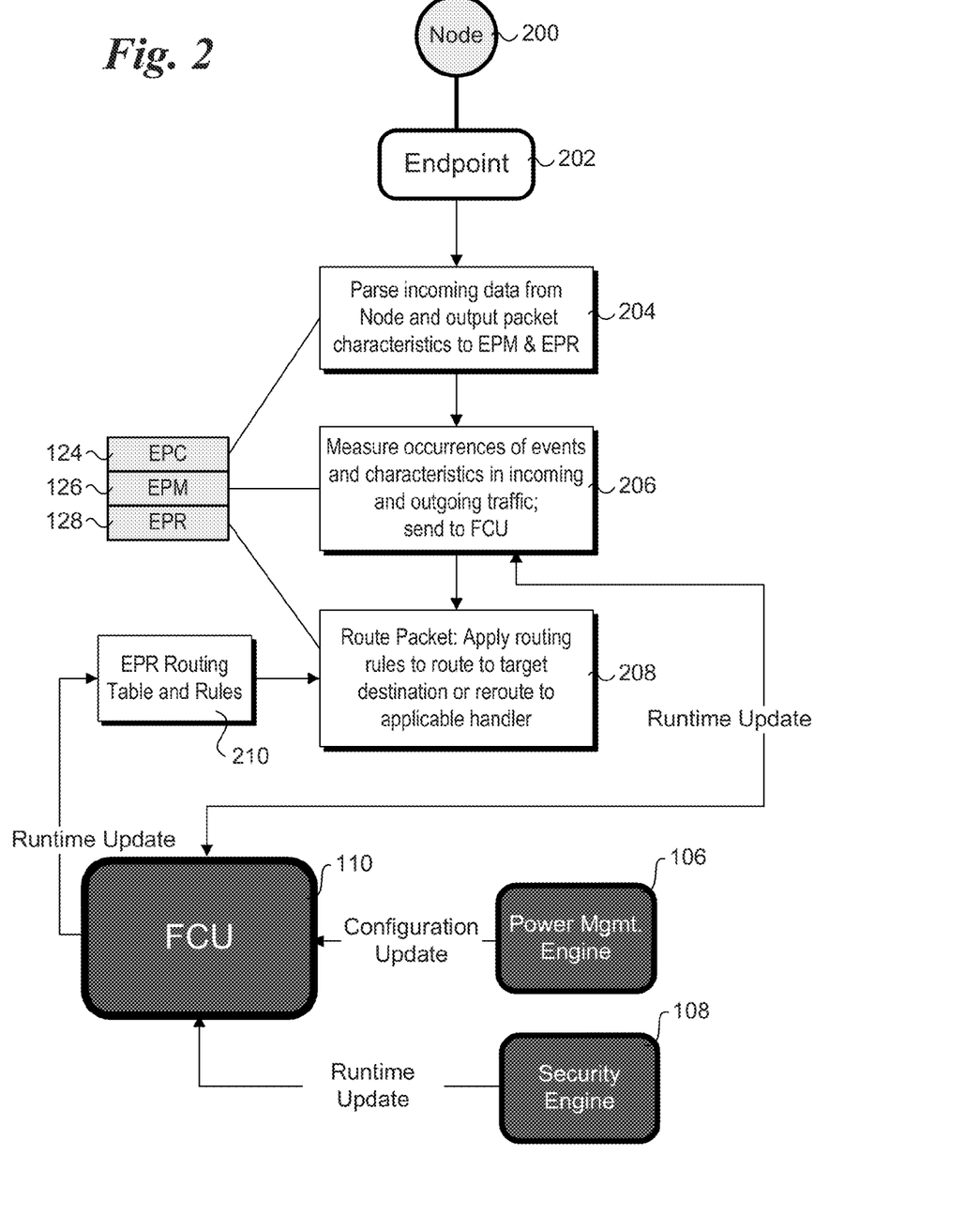
FIG. 2 is a combined flowchart and schematic diagram illustrating operations performed by the EPC, EMP, and EPR units of an endpoint.

With further reference to FIG. 1a and FIG. 2, each of power management engine 106, security engine 108, Fabric Control Unit (FCU) 110, and IP blocks 112 operate as an endpoint 202 coupled to a respective node 200 in a Network on a Chip that employs fabric 102 as a switch fabric that facilitated routing of data between endpoints 202. It will be understood that nodes 200 are not separate components, but rather are logical representations of endpoints from the perspective of terminology commonly used in computer networks, wherein a plurality of nodes are communicatively coupled together a wired or wireless network. In addition, each of the endpoint fabric interfaces 122-0 . . . 122-N in FIG. 1a is directly coupled to or integrated in its associated bridge or IP block. Accordingly, an endpoint fabric interface may also be referred to simply as an "endpoint" herein. In some embodiments, fabric 102 employs a multi-layer protocol similar to that employed by a computer network such as a LAN, and data is transferred between endpoints using a packet-based data transaction model. To facilitate routing of the packets, in one embodiment FCU 110 maintains a routing table 130 that includes various routing and forwarding paths, routing rules, etc., to facilitate routing between nodes 200. Meanwhile, each of the fabric ports 104 and agent port 120 include a local routing table 132 that defines packet routing/forwarding data and rules that are applicable to that particular port. In some embodiments, during initialization operations, FCU 110, fabric ports 104, and agent port 120 (and optionally other SoC components) exchange messages containing configuration data, enabling FCU 110 to gather network topology information to build a global network map for the system, in other embodiments the global network map of the system may be pre-configured. Based on the global network map, FCU 110 generates local routing table data for each fabric port 104 and agent port 120, and transfers the local routing data via fabric 102 to the fabric ports and agent port.

Under a conventional switch fabric usage, the endpoints corresponding to the various network nodes would generate packet-based data to facilitate data transactions with targeted destination endpoints in the network. Outbound data packets (i.e., data packets that are sent out from an endpoint) are queued in an endpoint's fabric interface and subsequently input to the fabric port 104 to which the fabric interface is coupled. Each packet has a header including data identifying a network address of the destination endpoint. Based on this destination address (and possibly other header information), the fabric port 104 performs a lookup in its local routing table 132 to determine what other fabric port or agent port the packet needs to be routed through the fabric to reach the endpoint corresponding to the destination address (e.g., the routing table defines the next hop for routing the packet). The combination of the fabric ports 104, agent port 120, and interconnect wiring and logic in fabric 102 facilitates a packet switching operation similar to a network switch or router, internally routing the packet data between applicable fabric/agent ports. As such, fabric 102 may also be referred to as a switch fabric. Once the packet data that is switched to a given fabric port or agent port is received, it is buffered and subsequently forwarded to the fabric interface of the destination endpoint.

In accordance with aspects of the embodiments of FIGS. 1 and 2, the conventional switch usage is augmented to support run-time fabric reconfiguration and re-routing of data packets in response to certain events, such as security events, node failures, and other detected errors. Referring to FIG. 2, this extended functionality is supported, in part, via operations performed by EPC 124, EPM 126, and EPR 128 in endpoints fabric interfaces 122-0 . . . 122-N, as depicted by operation blocks 204, 206, and 208.

Block 204 depicts operations performed by an Endpoint Classifier unit 124. The Endpoint Classifier unit parses incoming data from the Node (i.e., from the Node's associated endpoint) and outputs packet characteristics such as size, type, security level and destination address to the Endpoint Measurement unit 126 and Endpoint Routing unit 128.

In accordance with operations depicted in block 206, an Endpoint Measurement unit 126 measures occurrences of certain events and packet characteristics in incoming traffic and outgoing traffic. Generally, types of packet characteristics that need to be measured and events that can be generated as a result of these measurements can be programmed by FCU 110 or loaded at initialization from memory. This information can be used as statistical information for fabric management that can be read by FCU 110, used to generate fabric events (e.g., interrupts to the FCU or another unit) or used as an input for a routing decision (e.g., suspicious traffic that needs to be forwarded to a security controller) by EPR unit 128.

As shown in block 208, an EPR unit 128 is employed for routing packets. To facilitate this, in one embodiment EPR unit 128 includes routing tables and routing rules 210 that define exceptions to the (original) destination of each packet entering fabric 102 from the Node that the Endpoint belongs to, based on applicable criteria. Generally, the EPR routing tables and rules can be programmed by FCU 110 or loaded from memory during initialization and can be updated during runtime based on changes in system state, as described below. As used herein, the combination of routing table and/or routing rule data and logic for implementing the routing table and routing rules comprises routing logic. Accordingly, changes to the routing table and/or routing rules comprise a change in the routing logic.

During run-time operations, changes in power states of various components may be implemented, such as putting an IP block into a low power state or sleep state. In one embodiment, this is facilitated, at least in part, by power management engine 106. Upon changing the power state of a component, corresponding data is provided in the form of a configuration update to FCU 110. Depending on the implementation, configuration updates may be originated by a power management engine or similar component in response to power state changes of components, or, optionally, an FCU may periodically poll a power management engine for power state changes. Based on the power state configuration updates, FCU 110 maintain a local map of the power state of each component that may interface with fabric 102, including IP blocks 112.

In some embodiments, FCU 110 may also receive runtime updates from security engine 108. For example, security engine may detect a security problem based on information it is provided or collects from other system components, as well as based on information forwarded to security engine 108 from FCU 110, such as information generated by an EPM unit 126.

In view of changes to the power states of various components and run-time updates from security engine 108, FCU 110 sends run-time updates to the EPR routing table and rules for endpoint fabric interfaces 122-0 . . . 122-N over respective sideband channel connections 134-0 . . . 134-N. In addition, FCU 110 sends updated configuration information to EPM units 126.

On initialization or following system state changes, FCU 110 configures the EPM unit 126 and the EPR units 128 of all of the endpoints coupled to fabric 102. This defines which slow path accesses are routed to FCU 110, security engine 108, power management engine 106 or other engines, and which are sent directly to the IP block for the endpoint. For example, system state changes may include powering down of an IP, detection of a security event, the need to support a different operating system, failure of a node, etc. EPR units 128 re-route traffic entering fabric 102 according to EPR routing tables and routing rules 210; if re-routing for a packet is not applicable, the packet is routed in the normal manner via the Fabric. FCU 110 or another node (security engine 108, power management engine 106, etc.) responds to accesses routed to it. For example, a response could entail replying to an access instead of a powered down IP, waking up an IP, forwarding the access (either modified or not), discarding the access, loading context of an IP before power-down, emulating an IP that doesn't exist, etc.

Figure 3:
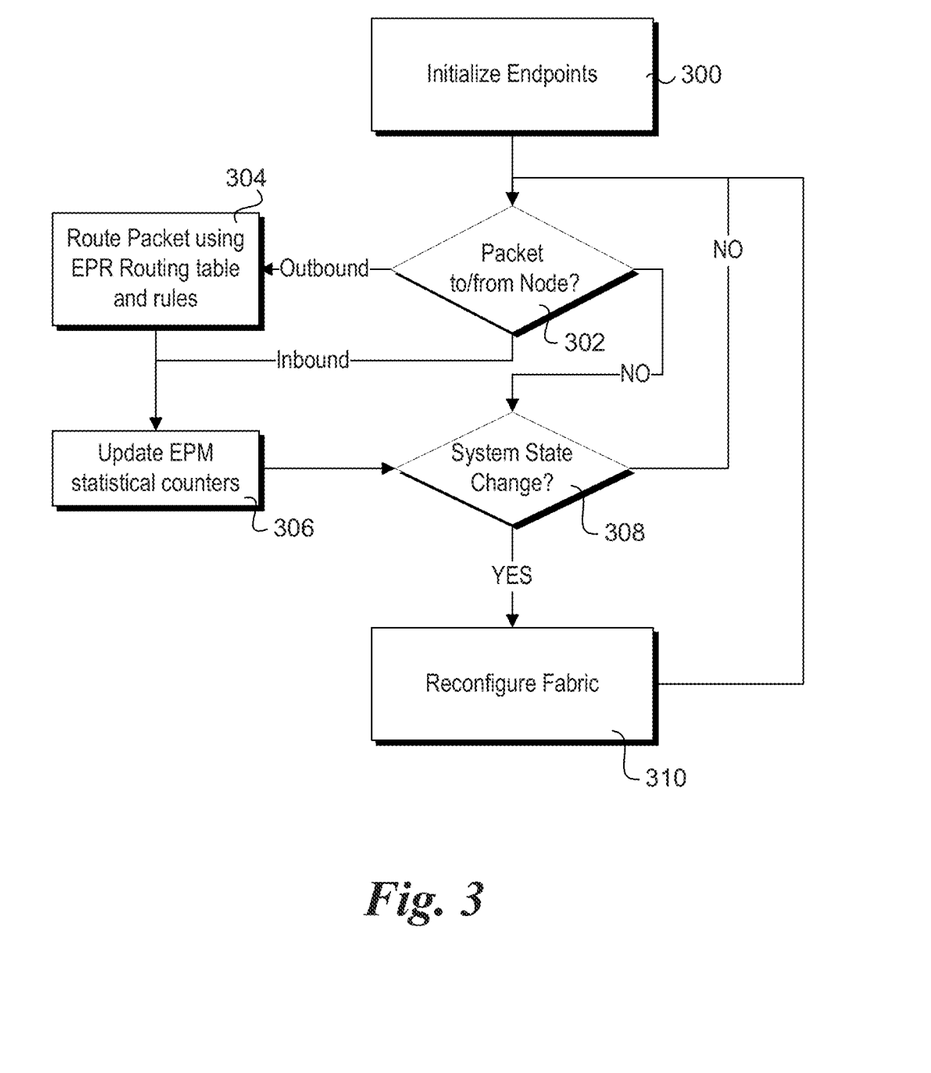
FIG. 3 is a flowchart illustrating operations performed to facilitate run-time reconfiguration of a fabric using the architecture of FIGS. 1 and 1b, according to one embodiment.

FIG. 3 shows a flowchart illustrating operations and logic performed by the system of architecture 100 during initialization and run-time operations, according to one embodiment. In a block 300, the endpoints are initialized. At startup, EPR routing tables and routing rules 210 are loaded for all endpoints on the fabric 102. Generally, this information may be received from FCU 110 via a sideband channel connection 134 or downloaded from memory 117. In addition, EPM unit 126 measurement traffic characteristics and event indication generation rules are loaded to applicable endpoints on fabric 102. As before, this information may be received from FCU 110 or downloaded from memory 117.

After initialization of the endpoints, run-time operations are performed on an ongoing manner, as illustrated by the remaining blocks and logic in FIG. 3, which corresponds to operation of a given endpoint. During run-time operations, various outbound data packets will be sent from and inbound data packets will be received at an endpoint. As depicted by a decision block 302, in response to detection of an outgoing packet, the logic flows to a block 304, in which routing data in EPR routing table and rules 210 is employed to (re-)route the packet. As discussed above, a packet will be routed in its normal manner (e.g., to its original destination endpoint) if no routing table entry or rule applies. Conversely, if a routing table entry or rule applies, the packet will be re-routed according to the table entry or rule. The logic then flows to a block 306, where the EPM statistical counters are updated. Returning to decision block 302, if the packet corresponds to an inbound packet, the logic flows directly to block 306 to update the EPM statistical counters.

During ongoing operations, system state changes may be detected in response to various events, such as a node being powered down, detection of a security event, specific data content being transmitted or received, etc, as depicted by a decision block 308. In response to detection of a system state change, the logic flows to a block 310 in which the fabric is reconfigured. During reconfiguration of the fabric, routing tables and routing rules in EPR units of the relevant endpoints are reconfigured to address the system state change. In one embodiment, a double buffer scheme may be used to avoid change of routing rules or tables when a packet is being routed in an EPR unit. Multiple routing tables maybe used in situations where the fabric is expected to be rapidly and repeatedly be reconfigured between different modes (for example in cases where multiple operating systems are running concurrently).

Figure 1B:
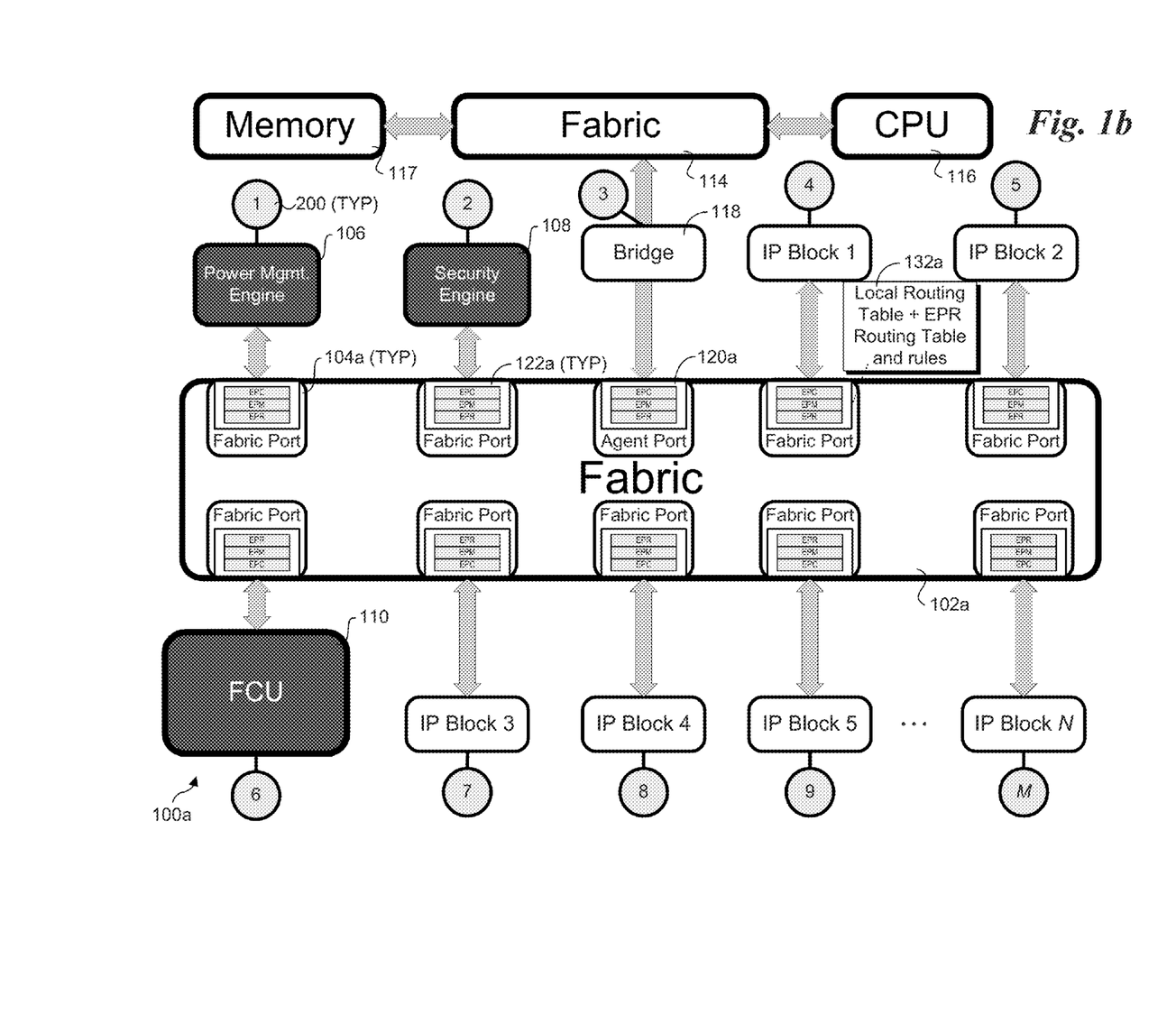
FIG. 1b is a schematic diagram illustrating an alternative configuration for the SoC architecture of FIG. 1 under which the endpoint fabric interfaces are integrated in the fabric.

In addition to integrating endpoint fabric interfaces 122 in associated components such as IP blocks and bridges, endpoint fabric interfaces may be implemented in the fabric. For example, FIG. 1b shows an architecture 100a that is similar to architecture 100, except in this instance endpoint fabric interfaces 122a are integrated in fabric ports 104a and an agent port 120a of a fabric 102a. The general operation of architectures 100 and 100a are similar, with the principle differences being the location of the endpoint fabric interfaces. One difference is that in the illustrated embodiment of FIG. 1a the local routing table and the EPR routing table and rules may be combined, as depicted by a block 132a. In addition, when the endpoint fabric interfaces are integrated in the fabric, configuration information may be transferred through the fabric itself, without employing separate sideband channels. Optionally, sideband channels may be implemented in the fabric configuration of architecture 100*b* (not shown).

The principles and teachings disclosed herein may be implemented on Systems, SoCs and NoCs and other integrated devices to facilitate run-time fabric reconfiguration as a function of system state. For example, a fabric may be reconfigured via a fabric controller unit that has knowledge of system states such as which nodes are powered down, what type of traffic is supported on certain nodes, what potential security threats exist on the fabric and what bugs exist on IPs connected to the fabric to dynamically re-route the traffic to elements on the fabric like security engines and microcontrollers that can process the traffic correctly. The following non-limiting examples illustrated example use cases for such implementations.

Under a first example use case, traffic destined to nodes on the fabric that are powered down, where the traffic is forwarded to a fabric microcontroller that is used as a proxy for the powered down node and holds all the required IP context. The controller decides either to power-up the node or complete the transaction autonomously. Using this scheme, the various IPs can be powered down completely when idle where only a small amount of wake circuitry is left to enable an IP to be powered up if needed. This allows for a systematic power management scheme for all IPs that can enable improved SoC idle power saving.

Figure 1C:
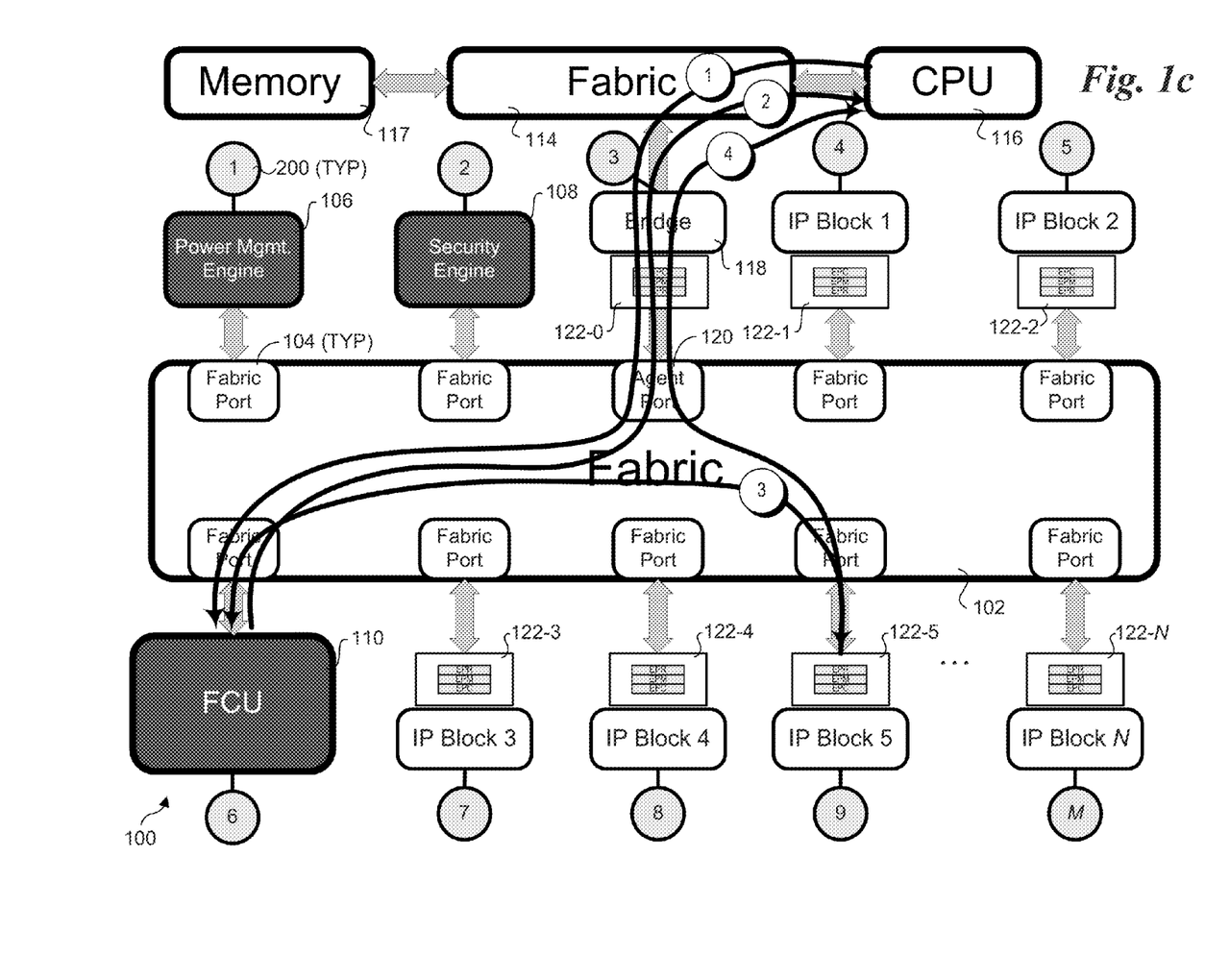
FIG. 1c is a schematic diagram illustrating packet flows corresponding to a transaction originating from a CPU that is rerouted to a fabric control unit to assist in servicing the transaction.

With reference to FIG. 1*c*, an implementation of the foregoing use case is illustrated using architecture 100. Under this example, a packet corresponding to a transaction originating from CPU 116 is originally destined for IP block 5, which has been put into a reduced power state by power management engine 106. In response to putting IP block 5 into the reduced power state, power management engine provides a corresponding power state configuration update to FCU 110. In turn, FCU 110 sends an update to the EPR unit of endpoint fabric interface 122-0 associated with fabric-to-fabric bridge 118 to update the EPR routing table and rules such that packets destined for IP block 5 are re-routed to FCU 110. This re-routing is shown by path 1 (depicted by an encircled '1') in FIG. 1*c*.

Upon receiving the packet, FCU 110 may be configured to handle it in various manners, depending on the applicable situation. For example, FCU 110 may be configured to autonomously handle certain transactions as a proxy for IP block 5, returning a transaction completion response to CPU 116 via path 2. Under other situations, the logic for handling the transaction may dictate that it needs to be serviced by IP block 5. Under this scenario, upon receiving the packet FCU 110 sends a request to power management engine 106 to power up IP block 5. After receiving confirmation from power management engine 106 that IP block 5 is powered up (and thus available for handling the transaction), the packet is forwarded from FCU 110 to IP block 5 via a path 3 to handle the transaction. IP block 5 may then return any applicable transaction data or completion data to CPU 116 either directly via a path 4, or via FCU 110 via paths 3 and 2.

Under another use case, traffic that is suspicious or violates security rules may be forwarded to a relevant security engine/controller instead of just being discarded and possibly causing a BSoD event. Using applicable filters/rules in the EPR rules and routing tables, such traffic can be identified and re-routed for appropriate handling. For example, traffic identified as a security or stability risk could be re-routed to a security entity such as security engine 108.

In some instances, predesigned IPs (e.g., from an IP library or the like) that do not support certain types of messages or other transactions that need to be supported on the fabric may be implemented on a SoC. Such traffic can be forwarded to a fabric microcontroller that will implement the functionality required by the message, thus avoiding the need to make hardware changes to such IPs. Similarly, design bugs may be detected after silicon arrival, where it might be possible to reconfigure the Fabric to route certain transactions to the Fabric controller and mitigate the problem.

Under some designs, SoC employ redundant IP blocks or otherwise include IP blocks that are designed to be employed when other IP blocks are powered down or have failed. Accordingly, failure of nodes on the Fabric that have redundancy can be addressed by detecting a failure and re-configuring the Fabric to route traffic destined to a failed node to a corresponding redundant node.

Another use case relates to feature prototype and development. Under this scenario, early implementations rely on the Fabric controller to provide the expected interface to software, but this can be smoothly transitioned to IP as the IP matures on a silicon/firmware level.

Run-time fabric reconfiguration may also be used to enhance virtualization implementations. For example, virtualization may be enhanced via creation of semaphores between an IP shared in real time, structured reset and/or hiding reset/reconfiguration delays as an IP is transferred from one owner to another.

Additional benefits may be provided through use of the runtime-fabric reconfiguration techniques disclosed herein. For example, the techniques may be used to enable improved systematic power management and/or security on the chip level. The techniques may also ease integration of third party IPs to existing and future SoC designs for a given vendor by enabling Firmware support of unique vendor-specific fabric messages and Fabric capabilities.

The techniques have the potential for increasing chances of getting operational A0 SoC silicon via a systematic approach to implementing post silicon firmware patches to address hardware bugs, and thus avoid the need to for another chip spin (i.e., design/build iteration). The techniques may be also result in reduced turn-around time of SoC software via a systematic approach to implementing post silicon firmware patches to address software backward compatibility issues. This may also increase the chances of being able to design a forward compatible driver that can be supplied to OEMs before silicon actually arrives, where Hardware incompatibility to the software can be fixed by implementing firmware fixes.

The techniques may also be advantageously used to enable next generation tablet features such as multiple operating system operation in a secure and robust manner. By implementing support for handling security issues and hardware failures and/or non-availability at the hardware level, such problems may be addressed in a manner that does not lead to operating system crashes or invoke security risks at the OS level.

It is envisioned that aspects of the embodiments disclosed herein may be implemented on various types of computing devices, including but not limited to mobile devices such as smart phones and tables, notebook, laptop and ultrabook computers, desktop computers, and servers. In accordance with some embodiments, run-time fabric reconfiguration may be implemented on SoCs employed in these computing devices. In addition to SoCs, run-time fabric reconfiguration may be implemented on other integrated devices as well.

Figure 4:
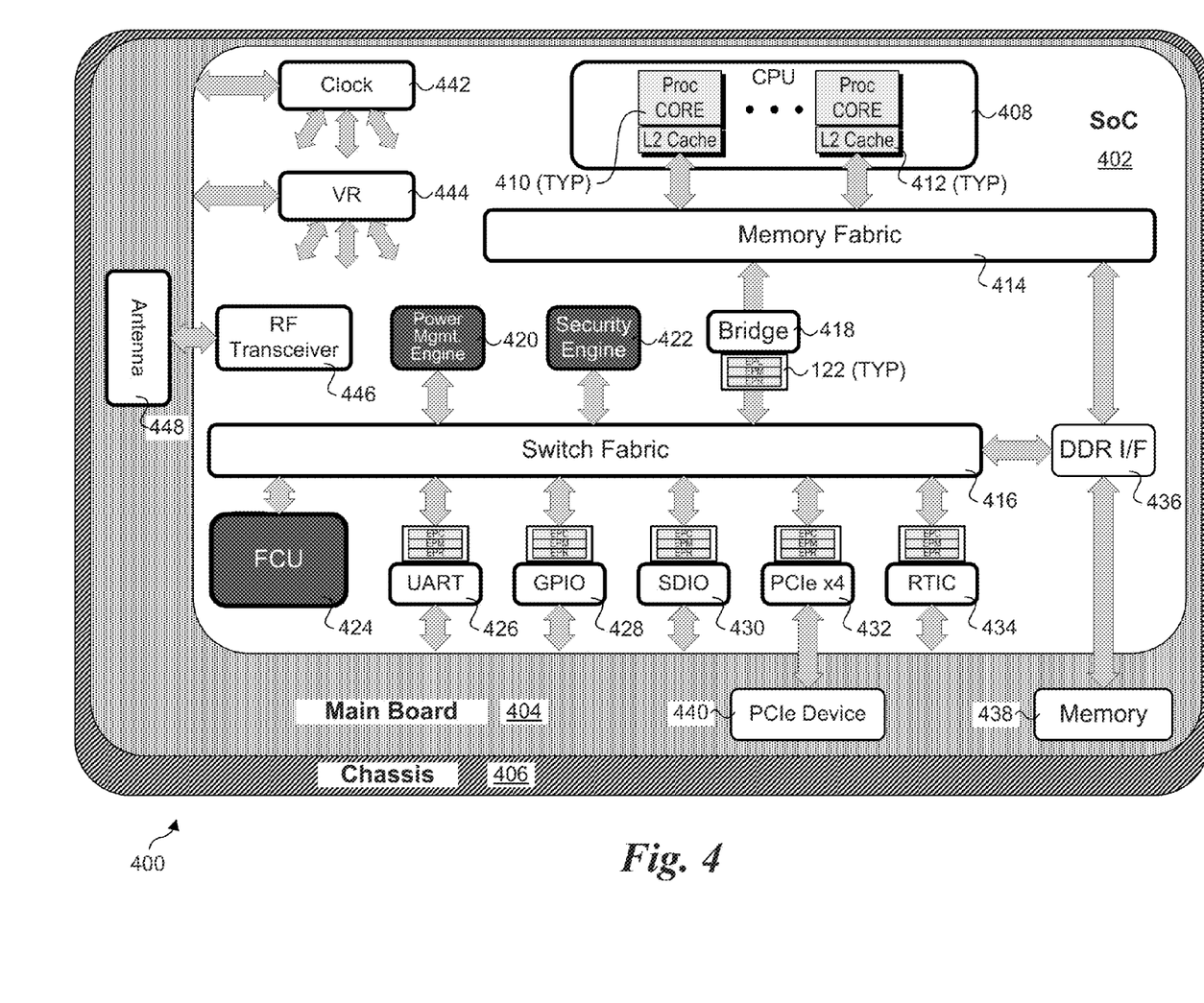
FIG. 4 is a schematic diagram of an exemplary computing device architecture employing an SoC that is configured to support run-time reconfiguration.

By way of illustration, FIG. 4 depicts selected components for an exemplary computing device 400 supporting run-time fabric reconfiguration. Computing device 400 includes SoC 402 mounted or otherwise operatively coupled to a main board 404 housed within a chassis 406. SoC 402 includes a CPU section 408 including one or more processor cores 410 having respective L2 caches 412, which are coupled to a memory fabric 414. Memory fabric 414, which may also sometimes be referred to as a coherent fabric (e.g., configured to support coherent memory cache operations) is connected to a switch fabric 416 via a fabric-to-fabric bridge 418. Also connected to switch fabric 416 is a power management engine 420, a security engine 422, an FCU 424, and a plurality of IP blocks including a Universal Asynchronous Receiver/Transmitter (UART) 426, a General Purpose Input-Output (GPIO) 428, a Secure Digital Input-Output (SDIO) 430, a Peripheral Component Interconnect Express (PCIe) x4 interface 432, and an Real-time Interrupt Controller (RTIC) 434. A Double Data-rate RAM interface (DDR I/F) 436 is also connected to switch fabric 416, memory fabric 414, and memory 438, which is mounted on main board 404. PCIe x4 interface is also coupled to a PCIe device 440 mounted on main board 404.

Additional components illustrated for SoC 402 include a clock 442, a Voltage Regulator (VR) 444, and an RF (Radio Frequency) transceiver 446. Clock 442 provides various clock signals to applicable components on the SoC. Similar, VR 444 provides regulated voltages to applicable SoC components. RF transceiver 446 is operatively coupled to an antenna 448 and generally may be configured to support one or more wireless standards, such as but not limited to any existing or future cellular communication standard (UMTS, CDMA, WCDMA, LTE, etc.), IEEE 802.11-based standard, and other wireless standards such as WIMAX. Generally, antenna 448 may be coupled to chassis 406 or mounted therein, and may be operatively coupled to RF transceiver 446 via wiring in main board 404 (if mounted to the main board) or coupled via a cable or flex circuit or the like.

As one of ordinary skill in the art would recognize, SoC 402 would include various additional components that are not illustrated in FIG. 4 in order to not obscure the inventive aspects of the embodiment.

In the illustrated embodiment, SoC 402 includes an endpoint fabric interface 122 for each of fabric-to-fabric bridge 418, UART 426, GPIO 428, SDIO 430, PCIe x4 interface 432, and RTIC 434. Optionally, an endpoint fabric interface may be implemented for one or more of FCU 424, power management engine 420 and security engine 422. As another option, one or more of the endpoint fabric interfaces may be integrated in switch fabric 416 or one or more of the IPs connected to the Fabric may not have an endpoint fabric interface. Additionally, SoC 402 may be configured to support side channel communication between FCU 424 and one or more of the SoC IP blocks.

In general, FCU 424 may be implemented as a microcontroller or the like. For example, such a microcontroller may comprise embedded logic for facilitating the operations described for the FCUs discussed herein, using various types of microcontroller architectures that are well-known in the processor arts.

Similarly, switch fabric 416 may be implemented using an existing or future switch fabric architecture. For example, such switch fabric architectures include but are not limited to Open Core Protocol (OCP), ARM-based fabrics, such as fabrics employing the Advanced Microcontroller Bus Architecture (AMBA) (e.g., Advanced High-performance Bus (AHB)), and Basic Virtual Component Interface (BVCI) interconnects. In one embodiment, switch fabric 416 comprises an Intel On-Chip System Fabric (IOSF) interconnect recently introduced by the Intel® Corporation.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A System on a Chip (SoC), comprising:
a semiconductor chip, having integrated thereon,
a switch fabric;
a plurality of endpoint fabric interfaces, each coupled to the switch fabric or integrated in the switch fabric;
a plurality of Intellection Property (IP) blocks, each coupled to a respective endpoint fabric interface or having an endpoint fabric interface integrated therein; and
a fabric controller, operatively coupled to the switch fabric and communicatively coupled to the plurality of endpoint fabric interfaces,
wherein each endpoint fabric interface includes a routing unit configured to hold a routing table and routing rules, and wherein the fabric controller is configured to at least one of update the routing table or routing rules for one or more of the endpoint fabric interfaces in response to detection of a system-state change event.

2. The SoC of claim 1, wherein an endpoint fabric interface further includes a classifier unit configured to parse packet data corresponding to a packet originating from an IP block associated with the endpoint fabric interface and output least one of a size, type, security level, or destination for the packet.

3. The SoC of claim 1, wherein an endpoint fabric interface further includes a measurement unit configured to measure occurrences of events and/or packet characteristics corresponding to incoming and/or outgoing traffic passing through the endpoint fabric interface, and wherein the fabric controller is configured to reconfigure the fabric based on measurements made by the measurement unit.

4. The SoC of claim 3, wherein the fabric controller is configured to collect measured data from a measurement unit of an endpoint fabric interface and update one or more of the routing table or routing rules for the endpoint fabric interface in view of the measured data.

5. The SoC of claim 4, further comprising a security engine operatively coupled to the switch fabric,
wherein the update to one or more of the routing table or routing rules for the endpoint fabric interface causes a packet having certain characteristics to be re-routed to the security engine.

6. The SoC of claim 1, wherein the plurality of endpoint fabric interfaces are communicatively coupled to the fabric controller via a sideband channel that is separate and apart from the fabric.

7. The SoC of claim 1, wherein the plurality of endpoint fabric interfaces are integrated in the switch fabric and are communicatively coupled to the fabric controller via the switch fabric.

8. The SoC of claim 1, further comprising:
a second fabric, coupled to the switch fabric via a fabric-to-fabric bridge;
at least one processor core, operatively coupled to the second fabric; and
an endpoint fabric interface, coupled between the fabric-to-fabric bridge and the switch fabric.

9. The SoC of claim 1, further comprising:
a power management unit, operatively coupled to the switch fabric and configured to control a power state of at least one IP block,
wherein the fabric controller is further configured to,
receive information from the power management unit identifying an IP block is operating in a reduced power state; and
update the routing table and/or routing rules for at least one endpoint fabric interface such that an outbound packet originating from an IP block associated with the at least one endpoint fabric interface and having an original destination of the IP block in the reduced power state is routed to the fabric controller.

10. The SoC of claim 9, wherein the fabric controller is further configured to:
send a request to the power management unit to power up the IP block in the reduced power state; and
forward the packet to the IP block.

11. The SoC of claim 1, wherein the fabric comprises one of an Open Core Protocol (OCP) fabric, an Advanced Microcontroller Bus Architecture (AMBA)-based fabric, or a Basic Virtual Component Interface (BVCI) interconnect.

12. A computing device, comprising:
a main board, enclosed within a chassis;
an input/output (TO) device, mounted to the main board;
a System on a Chip (SoC), operatively coupled to the main board, comprising,
a semiconductor chip, having integrated thereon,
a switch fabric;
a plurality of endpoint fabric interfaces, communicatively coupled to the switch fabric;
a plurality of Intellectual Property (IP) blocks, each comprising a block of logic circuitry embedded in the semiconductor chip that is coupled to a respective endpoint fabric interface or having an endpoint fabric interface integrated therein; and
a fabric controller, operatively coupled to the switch fabric and communicatively coupled to the plurality of endpoint fabric interfaces,
wherein each endpoint fabric interface includes a routing unit having a routing table and routing rules, wherein the fabric controller is configured to update at least one of the routing table or routing rules for one or more of the endpoint fabric interfaces in response to detection of a system-state change event, and wherein one of the plurality of IP blocks comprises an IO interface configured to facilitate communication between the SoC and the IO device when the computing device is operating.

13. The computing device of claim 12, further comprising an antenna, operatively coupled to or mounted within the chassis, wherein the SoC further includes a radio frequency transceiver that is operatively coupled to the antenna.

14. The computing device of claim 12, wherein the SoC further comprises:
a power management unit, operatively coupled to the switch fabric and configured to control a power state of at least one IP block,
wherein the fabric controller is further configured to,
receive information from the power management unit identifying an IP block is operating in a reduced power state; and
update the routing table and/or routing rules for at least one endpoint fabric interface such that an outbound packet originating from an IP block associated with the at least one endpoint fabric interface and having an original destination of the IP block in the reduced power state is routed to the fabric controller.

15. The computing device of claim 12, wherein the fabric controller is further configured to:

send a request to the power management unit to power up the IP block in the reduced power state; and forward the packet to the IP block.

16. The computing device of claim 12, wherein the SoC further comprises:
   a second fabric, coupled to the switch fabric via a fabric-to-fabric bridge;
   at least one processor core, operatively coupled to the second fabric; and
   an endpoint fabric interface, coupled between the fabric-to-fabric bridge and the switch fabric.

* * * * *